United States Patent Office 3,577,424
Patented May 4, 1971

3,577,424
**4-PHENYL-8-AMINO TETRAHYDROISO-
QUINOLINES**
Gustav Ehrhart, Bad Soden, Taunus, Karl Schmitt, Frankfurt am Main, Irmgard Hoffmann, Bad Soden, Taunus, and Heinrich Ott, Eppstein, Taunus, Germany, assignors to Farbwerke Hoechst Aktiengesellschaft vormals Meister Lucius & Bruning, Frankfurt am Main, Germany
No Drawing. Continuation-in-part of application Ser. No. 635,398, May 2, 1969. This application Oct. 20, 1969, Ser. No. 867,932
Claims priority, application Germany, May 5, 1966, F 49,122; Aug. 12, 1966, F 49,122; Apr. 15, 1967, F 52,134, F 52,135
Int. Cl. C07d 35/38
U.S. Cl. 260—287
9 Claims

ABSTRACT OF THE DISCLOSURE 4-phenyl-8-amino tetrahydroisoquinolines having centrally stimulating and thymoleptic action. Methods for their manufacture by ring closure, acylation, or reduction. Pharmaceutical compositions containing these compounds.

The present application is a continuation-in-part of application Ser. No. 635,398 filed May 2, 1967, now abandoned.

The present invention relates to 4-phenyl-8-amino tetrahydroisoquinolines which are valuable medicaments distinguished by a centrally stimulating and thymoleptic action.

In particular, the present invention relates to tetrahydroisoquinolines of the formula

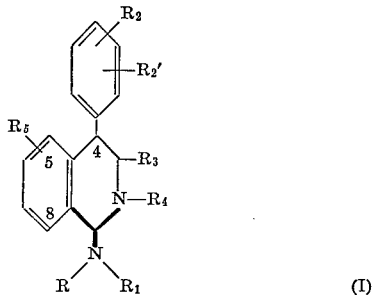

and their mono- and di-salts with physiologically acceptable acids, wherein R is hydrogen or lower alkyl. In the formula, $R_1$ is hydrogen; lower alkyl; lower alkanoyl; lower alkenoyl; benzyl; benzoyl; α-hydroxy-α-phenyl acetyl; α-acetoxy-α-phenyl acetyl; or succinimido. $R_2$ and $R_2'$, which may be the same or different, are hydrogen; Chlorine; trifluoromethyl; lower alkyl; lower alkoxy; or benzyloxy. $R_3$ and $R_4$, which may be the same or different, are hydrogen; lower alkyl; or benzyl. $R_5$, which is in the 5- or 6-position, is hydrogen, chlorine, or lower alkyl.

Compounds of this kind can be prepared by (a) effecting ring closure in a compound of the Formula II

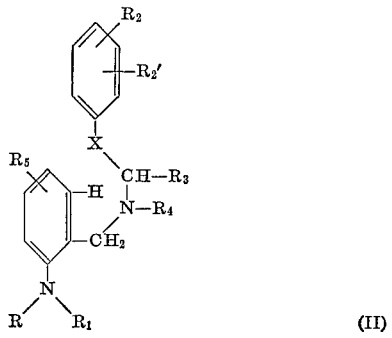

in which X represents —CHOH, which may be esterified, and R, $R_1$, $R_2$, $R_2'$, $R_3$, $R_4$ and $R_5$ have the meanings given above, by treating it with an agent causing ring closure; or by (b) treating with a compound of the general Formula III

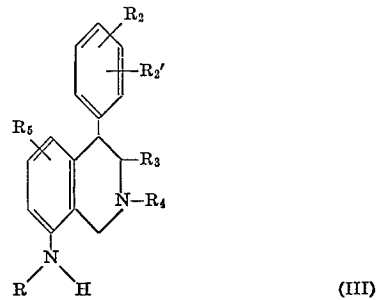

in which R, $R_2$, $R_2'$, $R_3$, $R_4$ and $R_5$ have the meanings given above, with the exception that $R_4$ is not hydrogen; or by (c) reducing a compound of the general Formula IV

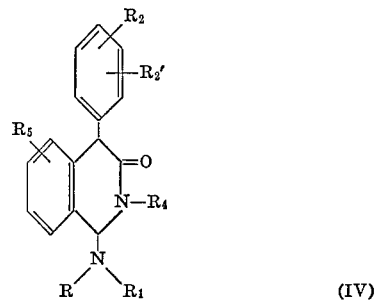

in which R, $R_1$, $R_2$, $R_2'$, $R_4$ and $R_5$ have the meanings given above and $R_4$ may also represent hydrogen, with a complex metal hydride. If desired, compounds of the general Formula I, in which $R_1$ and/or $R_4$ represent hydrogen atoms may be treated with alkylating agents, or benzyl radicals may be separated by conventional techniques from compounds of the general Formula I in which $R_1$ and/or $R_4$ represent benzyl. If desired, the salts obtained may be converted into free bases or the free bases obtained may be converted by treatment with physiologically tolerated acids into the corresponding salts.

As (2-amino-benzyl)-derivatives of the Formula II which can be used as starting substances in method (a) of the process of the invention, may be mentioned, for example:

N-(2-aminobenzyl)-1-phenyl-2-amino-propanol;
N-(2-aminobenzyl)1-1phenyl-2-methylamino-propanol;
N-(2-aminobenzyl)-1-phenyl-2-ethylamino-propanol;
N-(2-aminobenzyl)-1-phenyl-2-propylamino-propanol;
N-(2-aminobenzyl)-1-phenyl-2-isopropylamino-propanol;
N-(2-aminobenzyl)-1-phenyl-2-butylamino-propanol;
N-(2-aminobenzyl)-1-phenyl-2-sec.butylamino-propanol;
N-(2-aminobenzyl)-1-phenyl-2-isobutylamino-propanol;
N-(2-aminobenzyl)-1-phenyl-2-tert.butylamino-propanol;
N-(2-aminobenzyl)-1-phenyl-2-pentylamino-propanol;
N-(2-aminobenzyl)-1-phenyl-2-benzylamino-propanol;
N-(2-acetylaminobenzyl)-1-phenyl-2-amino-propanol;
N-(2-propionylaminobenzyl)-1-phenyl-2-amino-propanol;
N-(2-butyrylaminobenzyl)-1-phenyl-2-amino-propanol;
N-(2-valeroylaminobenzyl)-1-phenyl-2-amino-propanol;

N-(2-isovaleroylaminobenzyl)-1-phenyl-2-amino-propanol;
N-(2-benzoylaminobenzyl)-1-phenyl-2-amino-propanol;
N-(2-methylbenzoylaminobenzyl)-1-phenyl-2-amino-propanol;
N-(2-acryloylaminobenzyl)-1-phenyl-2-amino-propanol;
N-(2-dimethylacryloylaminobenzyl)-1-phenyl-2-propanol; or
N-(2-α-acetoxy-α-phenyl-acetylaminobenzyl)-1-phenyl-2-amino-propanol.

In the above compounds the amino group of the 2-amino benzyl radical may also be substituted by further low molecular weight alkyl or benzyl radicals, so that instead of "-amino-benzyl" there may also stand: -methylamino-benzyl; -dimethylaminobenzyl; -ethylamino-benzyl; -propyl- (or dipropyl) amino-benzyl; -isopropylaminobenzyl; -butylamino-benzyl; -sec.-butylamino-benzyl; -isobutylamino-benzyl; -tert.butylamino-benzyl; or -benzylamino-benzyl.

The amino group of the 2-amino-benzyl radical may also be substituted by an acyl group together with an alkyl or benzyl group, e.g. as in acetyl-methylaminobenzyl, propionyl - ethyl - aminobenzyl, acetyl - propylaminobenzyl, dimethylacryloyl-sec. butylaminobenzyl, and butyryl-benzylaminobenzyl.

Instead of "benzyl" in the N-(2-aminobenzyl) radical of the compounds mentioned above, may also stand the following radicals: 4- or 5-chlorobenzyl-; 5-methylbenzyl-; 4- or 5-ethylbenzyl-; 4- or 5-propylbenzyl-; or 4- or 5-butylbenzyl-. Instead of "1-phenyl," may also stand phenyl-substituted radicals, for example: 1-(2-, 3- or 4-chlorophenyl)-; 1-(3,4-di chloro-phenyl)-; 1-(2-, 3- or 4-methyl-, -ethyl-, -propyl-, -isopropyl-, -butyl-, -isobutyl-, -sec. butyl-, -tert. butyl-, or -pentyl-phenyl)-; 1-(2-, 3- or 4- trifluoromethyl-phenyl); 1-(2-, 3- or 4-methoxy-, -ethoxy-, -propoxy-, -butoxy-, or -benzyloxy-phenyl); 1-(3,4- or 2,5-dimethoxyphenyl); 1-(2,3-, 2,4- or 3,4-dimethyl-phenyl); or 1-(2-methyl-4-benzyloxy-phenyl).

Instead of "propanol," may also stand ethanol, butanol, pentanol, isopentanol, hexanol, 4-methyl-pentanol, 3,4-dimethyl-pentanol, 5-methyl-hexanol or 3-phenyl-propanol.

Instead of the hydroxy compounds (X=CHOH in II), the corresponding halides, such as the chlorides, bromides or iodides, or esters such as the sulfuric acid esters, and alkyl or aryl-sulfonic acid esters, can be used.

The starting materials can be prepared according to methods known per se. An advantageous starting substance is, for example, N-(2-aminobenzyl)-α-amino- (or α-methylamino)-propiophenone or N-(2-amino-benzyl)-1-phenyl-2- amino-(or 2-methylamino)-propanol-(1), which can be obtained according to the following reaction scheme (cf. Example 1):

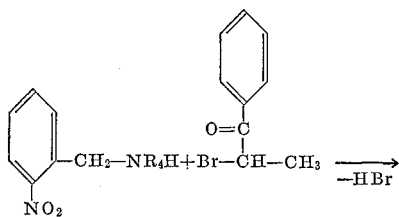

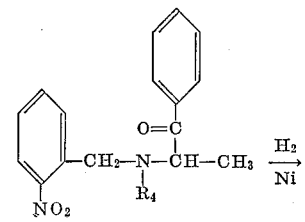

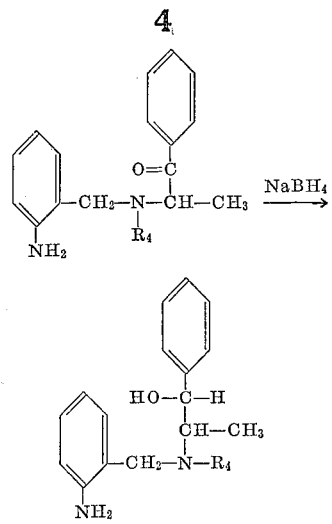

The substances of Formula II in which $R_1$ represents an acyl radical can be obtained by acylation of the corresponding amino-compounds.

Preparation of the compounds of the present invention proceeds by ring closure in a compound of the general Formula II, whereby either water, a hydrohalic acid, a sulfonic acid, or a carboxylic acid, depending on the meaning of X, is split off. The reaction can be carried out in the presence or in the absence of a solvent or diluent, and the reaction temperature can be varied within wide limits in correspondence with the varying reactivity of the radical X.

Acid condensing agents are used for the condensation. For example, if X represents the group —CHOH, either sulfuric acid, phosphoric acid, polyphosphoric acid or boron trifluoride may be used. Friedel-Crafts catalysts may also be used, for example, those described in Houben-Weyl "Methoden der organischen Chemie," 4th edition, volume 4, part 2 pages, 67, 68, and 223. For example, if the process is started from a compound of the Formula II in which X represents the —CHOH group, a short treatment with sulfuric acid at temperatures of about 15° C. or less is sufficient to effect the desired ring closure.

The products of the invention in which $R_1$ represents an acyl radical may also be prepared according to method (b) by treating compounds of the general Formula III—which can be prepared according to method (a)—with acylating agents. The acylation is carried out according to the usual methods using the halides, especially the chlorides, of carboxylic acids, for example low molecular weight aliphatic carboxylic acids, aromatic carboxylic acids whose phenyl nucleus may be substituted or araliphatic carboxylic acids which may be substituted. These carboxylic acids, or their derivatives, may be used for the acylation. The acylation can be effected in the presence or in the absence of solvents. As solvents, organic solvents are generally used. It is also possible to operate in the presence of agents which bind hydrogen halides, for example, tertiary organic amines such as pyridine or triethylamine, or in the presence of inorganic alkaline substances, for example alkali metal or alkaline earth metal hydroxides, carbonates, and the like.

The acylation can also be carried out in the usual manner with corresponding anhydrides of carboxylic acids and it is possible to use mixed anhydrides of two different carboxylic acids or inner anhydrides of dicarboxylic acids. In compounds of the Formula III, $R_4$ must be alkyl or benzyl to prevent simultaneous N-acylation in the 2-position.

In method (c) of the process of the present invention, isoquinolones of the general Formula IV are reduced by means of complex metal hydrides. These isoquinolones can be prepared in a manner analyogous to the method for the preparation of corresponding 5-membered rings described in "Berichte der deutschen chemischen Gesellschaft," volume 57, page 289 (1924), by using the corresponding benzylamine derivatives instead of the aniline derivatives employed in said method.

Reduction by means of complex metal hydrides, for which especially lithium-aluminum hydride is used, is effected in the usual manner in inert solvents, for example in ether or tetrahydrofurane. Working up is effected in the manner usual in such reductions by decomposition of the complex metal hydrides and isolation of the reaction product.

If $R_1$ or $R_4$, or both radicals of the isoquinolones, represent an acyl group, it is suitable to use a corresponding excess of complex metal anhydrides in order to effect reduction of the acyl groups.

Any N- or O-benzyl group which may be present can be eliminated hydrogenolytically in known manner by treatment with a hydrogenation catalyst, preferably palladium and hydrogen. The dissociation of ether groups which may be necessary is also possible, for example, by heating with strong acids, preferably hydrobromic acid, or with aluminum halides.

As basic compounds, the compounds of the invention are capable of forming salts with acids. If $R_1$ is not acyl, mono- and di-acid addition salts can be formed. If $R_1$ is acyl, only mono-salts are obtained. Physiologically tolerated acids are used for such a salt formation in view of the intended use of the compounds as medicaments. Among such acids, mineral acids may be used, for example, hydrohalic acids such as hydrochloric acid or hydrobromic acid; sulfuric acid; phosphoric acid; and amidosulfonic acid. As organic acids, there may be mentioned, for example: formic acid; acetic acid; propionic acid; lactic acid; glycolic acid; gluconic acid; maleic acid; succinic acid; tartaric acid; benzoic acid; salicylic acid; citric acid; aceturic acid; or oxyethane-sulfonic acid.

The products of the invention are valuable medicaments which are distinguished in particular by a centrally stimulating and thymoleptic action.

The centrally stimulating action was proved by measurements of the motility of not pretreated animals (method described by L. Ther, Dtsch. Apoth.-Ztg. 1953, page 292), or by reversal of the depression provoked in a mouse by tetrabenazine. This effect was achieved for example, with 10 mg./kg. of 1,2,3,4-tetrahydro-2,3-dimethyl-4-phenyl-8-aminoisoquinoline hydrochloride, administered subcutaneously. An increase in motility could be provided after intravenous administration of only 2 mg./kg. of the same compound. The thymoleptic component becomes evident in the antagonism to the catatonia and ptosis of the upper eyelid in rats provoked by reserpine, or in the extinguishing of the catatonia provoked by tetrabenazine. Upon subcutaneous application of 5 mg./kg. of the above-mentioned compound, the ptosis and the catatonia provoked by tetrabenazine were relieved. [Methods analogous to those described by R. Domenjoz and W. Theobald, Arch. int. Pharmacodyn., 120, 450 (1959); F. Sulser, J. Watts and B. B. Brodie, Fed Proc. 19, 268 (1960); Ann. N. Y. Acad. Sci. 96, 279 (1969)].

The compounds of the invention can be administered either parenterally or orally as such or in form of the corresponding salts, if desired in admixture with the usual pharmaceutical carrier substances. In the case of oral administration, it is preferable to administer them in the form of tablets or dragees which contain the products of the invention as the active substance and the usual carriers such as lactrose, starch, tragacanth, and magnesium stearate.

Oral administration of the products of the invention is preferred, and the usual dose for humans is, in general, 1–20 mg. per dosage unit. Such doses can also be administered several times daily, depending on the reactions of the patient. In order to obtain a very rapid onset of action, the products of the invention may also be administered parenterally. For such parenteral administration, i.e. for injections, aqueous solutions of the salts of the basic compounds are preferably used.

The following examples illustrate the invention but they are not intended to limit it thereto:

EXAMPLE 1

(a) A solution of 20 g. of N-(2-amino-benzyl)-1-(3,4-dimethyl-phenyl)-2-methylamino-propanol-(1) [melting point: 99–101° C.; prepared by the reaction of α-bromo-3,4-dimethyl-propiophenone with (2-nitro-penzyl)-methylamine in alcohol, subsequent hydrogenation of the nitro group by means of nickel on diatomaceous earth at room temperature, and reduction of the CO group by means of sodium borohydride] in 100 ml. of methylene chloride was introduced dropwise into 125 ml. of sulfuric acid at 10–15° C. After standing for a short time, the reaction mixture was poured onto ice and rendered alkaline with a sodium hydroxide solution. By extraction with ether, 18.4 g. of 1,2,3,4-tetrahydro-2,3-dimethyl-4-(3,4-dimethyl-phenyl)-8-amino-isoquinoline were obtained, which when treated with 1 equivalent of hydrochloric acid gave a hydrochloride melting at 266–268° C.

(b) In analogous manner, but starting from α-bromo-acetophenone and (p-nitro-benzyl)-methylamine, N-(2-amino-benzyl)-1-phenyl-2-methylamino-ethanol-(1) was obtained as a crude product in the form of an oil. This was converted as such in the manner described above into 1,2,3,4-tetrahydro-2-methyl-4-phenyl-8-amino-isoquinoline. [Melting point of the maleinate: 199–201° C. (from ethanol).]

(c) Starting from α-bromo-3,4-dimethyl-butyrophenone and (2-nitro-benzyl)-methylamine, 1,2,3,4-tetrahydro-3-ethyl-2-methyl-4-(3,4-dimethyl-phenyl) - β-amino-isoquinoline was obtained in an analogous manner. [Melting point of the hydrochloride 242–244° C. (from water).]

(d) In analogous manner, starting from α-bromo-β-phenyl-3,4-dimethyl-propiophenone and (2-nitrobenzyl)-methylamine, 1,2,3,4-tetrahydro-3-benzyl-2-methyl-4-(3,4-dimethyl-phenyl)-8-amino-isoquinoline was obtained, the hydrochloride of which was found to melt at 175–180° C. after crystallization from a mixture of ethanol and ether and digestion with water.

(e) In analogous manner, starting from α-bromo-acetophenone and (2-nitro-benzyl)-ethylamine, 1,2,3,4,-tetrahydro-2-ethyl-4-phenyl-8-amino-isoquinoline was obtained, the maleinate of which was found to melt at 191–193° C.

(f) In analogous manner, starting from α-bromo-3,4-dimethyl-propiophenone and (2-nitro-benzyl)-ethyl-amine, 1,2,3,4-tetrahydro-2-ethyl - 3-methyl - 4 - (3,4 - dimethyl)-phenyl)-8-amino-isoquinoline was obtained. [Melting point of the meleinate: 175–177° C. (from a mixture of ethanol and ether).]

(g) In analogous manner, starting from α-bromo-3,4-dimethyl-acetophenone and (2-nitro-benzyl)-ethyl-amine, 1,2,3,4-tetrahydro-2-ethyl - 4 - (3,4-dimethyl-phenyl) - 8-amino-isoquinoline was obtained. [Melting point of the maleinate 202–204° C. (from ethanol).]

(h) α-bromo-acetophenone and (2 - nitro - benzyl - isopropyl-amine were reacted in an analogous manner to prepare 1,2,3,4-tetrahydro-2-isopropyl-4-phenyl-8 - amino-isoquinoline maleinate which was found to melt at 194–196° C. (from ethanol).

(i) In analogous manner, there was obtained, starting from α-4-dichloroacetophenone and (2-nitro-benzyl)-methylamine, 1,2,3,4-tetrahydro-2-methyl - 4 - (p - chlorophenyl)-8-amino-isoquinoline, the maleinate of which was found to melt at 209–211° C. (with decomposition) after recrystallization from ethanol.

(j) In analogous manner, starting from α-bromo-3-methyl-4-chloro - propiophenone and (2 - nitro - benzyl)-methylamine, 1,2,3,4-tetrahydro-2,3-dimethyl-4-(3-methyl-4-chloro-phenyl)-8-amino-isoquinoline was obtained, the di-hydrochloride of which was found to melt at 184–186° C., after recrystallization from ethanol.

EXAMPLE 2

N-(2-nitro-benzyl)-α-methylamino-propiophenone [obtained from (2-nitro-benzyl)-methylamine and α-bromo-propiophenone, or from 2-nitro-benzyl chloride and α-methylamino-propiophenone] was hydrogenated with nickel and hydrogen at room temperature to yield N-(2-amino-benzyl)-α-methylamino-propiophenone, from which N-(2-amino-benzyl)-1-phenyl-2 - methylamino - propanol-(1) (melting point 94–96° C., from cyclohexane) was obtained by reduction with sodium boron hydride in methanol.

The same compound was obtained by reacting 2-nitro-benzyl chloride with 1-phenyl-2-methylamino-propanol-(1) to yield N-(2-nitro-benzyl)-1-phenyl-2-methylamino-propanol-(1), the hydrochloride of which was found to melt at 207–209° C., and reducing the nitro group with Raney nickel. 15 grams of N-(2-amino-benzyl)-1-phenyl-2-methylamino-propanol-(1) were introduced at 30–35° C. into 75 ml. of sulfuric acid. After 30 minutes, the reaction mixture was poured onto ice and rendered alkaline by means of a sodium hydroxide solution. By extraction with ether, 12.9 grams of 1,2,3,4-tetrahydro - 2,3 - dimethyl-4-phenyl-8-amino-isoquinoline were obtained, the hydrochloride of which was found to melt at 267–269° C. after crystallization in water.

EXAMPLE 3

(a) An equimolar mixture of laevorotatory α-acetyl-benzyl alcohol and benzylamine was hydrogenated with palladium in methanol at 40° C. The 1-phenyl-2-amino-propanol-(1) thus obtained was reacted with 2-nitro-benzaldehyde in benzene with separation of water, which was distilled off together with the solvent. After reduction of the nitro group with nickel on diatomaceous earth, and of the azo-methine double linkage with sodium borohydride, N-(2-amino-benzyl)-1-phenyl-2 - amino - propanol-(1) was obtained in the form of an oil.

22 grams of this product were reacted according to the method described in Example 1. After pouring the reaction mixture into ice water, the sulfate of 1,2,3,4-tetra-hydro-3-methyl-4-phenyl - 8 - amino - isoquinoline (20 g.) crystallized first. This was then converted into the free base (melting point 215–217° C.) and finally into the hydrochloride (melting point 297–302° C., from water).

(b) In analogous manner, starting from 2-nitro-5-chloro-benzaldehyde and 1-phenyl-2-amino-propanol-(1), 1,2,3,4-tetrahydro-3-methyl-4-phenyl-5-chloro - 8 - amino-isoquinoline was obtained, which was found to melt at 156–158° C. (from cyclohexane). The hydrochloride was found to melt at 114–118° C. (from a mixture of ethanol and water).

EXAMPLE 4

15 grams of N-(2-amino-benzyl)-1-phenyl-2-methyl-amino-propanol-(1) (prepared as described in Example 2), were introduced, while stirring, into 100 ml. of poly-phosphoric acid. The mixture was heated for 15 minutes to 70–80° C. After cooling, the solution was poured into cold water, rendered alkaline by means of sodium hydroxide solution, and the base was taken up in ether. After evaporation of the ether extract which had been dried over sodium sulfate, 12.5 g. of reaction product remained in the form of an oil. By treating this product with dilute hydrochloric acid, 8.7 grams of 1,2,3,4-tetrahydro-2,3-dimethyl-4-phenyl - 8 - amino-isoquinoline hydrochloride were obtained, which was identical with the product obtained according to Example 2.

EXAMPLE 5

(a) 22 grams of 1,2,3-4-tetrahydro-2,3-dimethyl-4-phenyl-8-amino-isoquinoline were dissolved in 200 ml. of anhydrous benzene. A solution of 6.8 grams of acetyl chloride in 50 ml. of anhydrous benzene was added dropwise at 15–20° C. while stirring. The crystal magma that formed after boiling for one hour was filtered off with suction, dried, and recrystallized from 200 ml. of ethanol. 13 grams of 1,2,3,4-tetrahydro-2,3-dimethyl-4-phenyl-8-acetamino - isoquinoline hydrochloride melting at 163–165° C. were obtained.

(b) In analogous manner, starting from 1,2,3,4-tetra-hydro - 2,3 - dimethyl-4-phenyl-8-amino-isoquinoline and β,β-dimethyl-acrylic acid chloride, 1,2,3,4-tetrahydro-2,3-dimethyl - 4 - phenyl - 8-(β,β-dimethyl-acryloyl-ammino)-isoquinoline hydrochloride was obtained, which was found to melt at 232–234° C. (from a mixture of ethanol and ether).

(c) In analogous manner, there was obtained, starting from 1,2,3,4 - tetrahydro - 2,3 - dimethyl-4-phenyl-8-amino-isoquinoline and benzoyl chloride, 1,2,3,4-tetrahydro - 2,3 - dimethyl - 4-phenyl-8-benzoylamino-isoquinoline hydrochloride melting at 249–251° C. (from a mixture of ethanol and ether).

(d) In analogous manner, starting from 1,2,3,4-tetra-hydro - 2,3 - dimethyl-4-phenyl-8-amino-isoquinoline and hexene-(2)-acid chloride, 1,2,3,4-tetrahydro-2,3-dimethyl-4 - phenyl - 8-($\Delta^a$-hexenoylamino)-isoquinoline was obtained, melting at 97–99° C. (from cyclohexane). The oxalate was found to melt at 194–196° C. (from ethanol).

(e) In analogeous manner, starting from 1,2,3,4-tetra-hydro - 2,3 - dimethyl - 4 - phenyl-8-amino-isoquinoline and O-acetyl-mandelic acid chloride, 1,2,3,4-tetrahydro-2,3 - dimethyl - 4 - phenyl   8 - (α-acetoxy-α-phenyl-acetamino)-isoquinoline hydrochloride was obtained, melting at 250–253° C. (from ethanol).

(f) By hydrolysis of 1,2,3,4-tetrahydro-2,3-dimethyl-4-phenyl - 8 - (α-acetoxy-α-phenyl-acetamino)-isoquinoline hydrochloride with an equimolar quantity of a binormal sodium hydroxide solution, 1,2,3,4-tetrahydro-2,3-di-methyl - 4 - phenyl - 8 - (α-phenyl-α-hydroxy-acetamino)-isoquinoline melting at 183–186° C. (from ethanol) was obtained. The hydrochloride of this compound was found to melt at 241–243° C. after recrystallization from ethanol.

(g) To a solution of 36 g. of 1,2,3,4-tetrahydro-2,3-dimethyl-4-phenyl-8-amino-isoquinoline and 300 ml. of acetone, 14.3 g. of succinic acid were added, while stirring, and the whole was boiled for 2 hours under reflux. The resulting crystal magma was filtered off after cooling and dried. The 1,2,3,4-tetrahydro-2,3-dimethyl-4-phenyl-8-succinamindo-isoquinoline obtained was found to melt at 197–200° C. The hydrochloride was found to melt at 195-197° C. (from a mixture of ethanol and ether).

EXAMPLE 6

A solution of 23.6 grams of acetyl chloride in 50 ml. of anhydrous benzene was added dropwise, while stirring, at 15–20° C., to a solution of 80.7 grams of N-(2-amino-benzyl) - 1 - phenyl-2-methylamino-propanol-(1) in 300 ml. of anhydrous benzene alnd 30.3 g. of triethylamine. After boiling for one hour, the whole was filtered with suction and the filtrate was evaporated. From the residue, N-(2-acetamino-benzyl) - 1 - phenyl - 2 - methylamino-propanol-(1), melting at 88–90° C., was obtained by recrystallization from cyclohexane.

10 grams of N - (2 - acetamino-benzy)-1-phenyl-2-methylamino-propanol-(1) were reacted as described in Example 1 with sulfuric acid to yield 1,2,3,4-tetrahydro-2,3-dimethyl - 4 - phenyl - 8 - acetamino-isoquinoline. The free base obtained was found to melt at 141–143° C., after recrystallization from isopropanol. The hydrochloride was found to melt at 163–165° C. (from ethanol).

EXAMPLE 7

10 grams of 1,2,3,4 - tetrahydro-2-methyl-4-phenyl-8-amino-isoquinoline-(3) [melting point: 179–181° C.; prepared by the condensation of N-methyl-N-(2-amino-benzyl)-mandelic acid amide with sulfuric acid] were reduced by means of 1.1 gram of lithium-aluminum hydride in boiling tetrahydrofurane. The resulting 1,2,3,4-tetrahydro - 2 - methyl - 4 - phenyl-8-amino-isoquinoline (4.8 grams) was converted into the maleinate (melting point 199–201° C.) by reaction with maleic acid.

EXAMPLE 8

10 grams of N - (2-acetamino-benzyl)-1-phenyl-2-methylamino-propanol(1) were boiled with 100 grams of boron fluoride etherate for 4 hours under reflux, while stirring. After cooling, the solution was poured into ice-water, rendered alkaline with a solid hydroxide solution, and extracted with ether. The ether solution was evaporated and the residue was treated with alcholic hydrochloric acid. 3 grams of 1,2,3,4-tetrahydro-2,3-dimethyl-4-tetrahydro-2,3-dimethyl-4-phenyl - 8 - acetamino - isoquinoline hydrochloride melting at 163–165° C. were obtained.

EXAMPLE 9

10.0 g. of 1,2,3,4 - tetrahydro - 2-methyl-4-phenyl-8-amino-isoquinoline were slowly added to a mixture of 3.2 g. of p-formaldehyde and 5.8 g. of formic acid prepared at 90–95° C., and the whole was heated for 15 minutes on a steam bath. After cooling, the reaction mixture was combined with 170 ml. of dilute sodium hydroxide solution and extracted with methylene chloride. 8.7 g. of the corresponding dimethylamino compound, the napthalene-1,5-disulfonate of which was found to melt at 290–294° C. with decomposition, were obtained from the methylene chloride extract after drying and evaporation.

EXAMPLE 10

4.4 g. of N - (2 - benzylamino-benzyl)-1-phenyl-2-benzylamino-propanol-(1), obtained in the form of an oil by reaction of N-(2 - aminobenzyl)-1-phenyl-2-aminopropanol-(1) with benzyl chloride, were introduced slowly at 10° C. into 80 ml. of sulfuric acid. The temperature was then allowed to rise slowly to 20° C., the reaction mixture was poured on ice, and rendered alkaline with sodium hydroxide solution. The product which was isolated by extraction with ether was fractionated by elution with diisopropyl ether and cyclohexane on a column of aluminum oxide. 0.7 g. of 1,2,3,4-tetrahydro-2-benzyl-3 - methyl-4-phenyl-8-benzyl-amino-isoquinoline was obtained. Its naphthalene-1,5-disulfonate was found to melt, after recrystallization from 50% aqueous ethanol, at 170–173° C. (with decomposition).

What is claimed is:

1. A 4-phenyl 8-amino tetrahydroisoquinoline of the formula

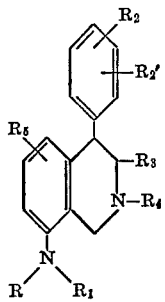

and salts thereof with a physiologically acceptable acid, wherein R is hydrogen or alkyl having up to three carbon atoms; $R_1$ is hydrogen, alkyl having up to three carbon atoms, acetyl, $\beta,\beta$-dimethyl acryloyl, $\Delta^\alpha$-hexenoyl, benzyl, benzoyl, $\alpha$-hydroxy-$\alpha$-phenyl-acetyl, $\alpha$-acetoxy-$\alpha$-phenyl-acetyl, or $\beta$-carboxypropionyl; $R_2$ and $R_2'$, which may be the same or different, are hydrogen, chlorine, or alkyl having up to three carbon atoms; $R_3$ and $R_4$, which may be the same or different, are hydrogen, alkyl having up to three carbon atoms, or benzyl; and $R_5$, which is in the 5- or 6-position, is hydrogen or chlorine.

2. A compound as in claim 1 wherein $R_4$ is alkyl having up to three carbon atoms.

3. A compound as in claim 1 wherein R is hydrogen and $R_1$ is acetyl.

4. A compound as in claim 1 wherein R is hydrogen and $R_1$ is $\beta,\beta$-dimethyl-acryloyl.

5. A compound as in claim 1 wherein R is hydrogen and $R_1$ is $\Delta^\alpha$-hexenoyl.

6. A compound as in claim 1 wherein R, $R_1$, $R_2$, $R_2'$, $R_3$, and $R_5$ are each hydrogen and $R_4$ is methyl.

7. A compound as in claim 1 wherein R, $R_1$, $R_2$, $R_2'$, $R_3$, and $R_5$ are each hydrogen and $R_4$ is isopropyl.

8. A compound as in claim 1 wherein R, $R_1$, $R_2$, $R_2'$, $R_4$, and $R_5$ are each hydrogen and $R_3$ is methyl.

9. A compound as in claim 1 wherein R, $R_2$, $R_2'$, and $R_5$ are each hydrogen, $R_1$ is acetyl, and $R_3$ and $R_4$ are each methyl.

References Cited

UNITED STATES PATENTS

| 2,508,937 | 5/1950 | Campbell | 260—288 |
|---|---|---|---|
| 3,666,059 | 1/1954 | Davis | 260—288 |
| 3,384,640 | 5/1968 | Muchowski | 260—286 |
| 3,435,040 | 3/1969 | Hardtmann et al. | 260—288 |
| 3,452,026 | 6/1969 | Perron | 260—288 |

FOREIGN PATENTS

| 1,524,487 | 5/1968 | France | 260—288 |

DONALD G. DAUS, Primary Examiner

U.S. Cl. X.R.

260—288, 562, 570.5, 570.8, 592; 424—258

UNITED STATES PATENT AND TRADEMARK OFFICE
CERTIFICATE OF CORRECTION

PATENT NO. : 3,577,424

DATED : May 4, 1971

INVENTOR(S) : Ehrhart et al.

It is certified that error appears in the above-identified patent and that said Letters Patent are hereby corrected as shown below:

Formula I at column 1, lines 35 to 45, should be corrected to read:

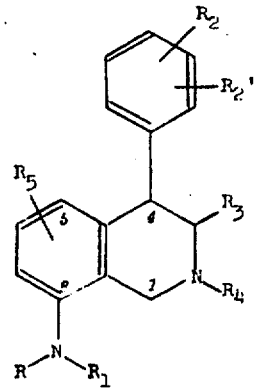

Formula IV at column 2, lines 25 to 35, should be corrected to read:

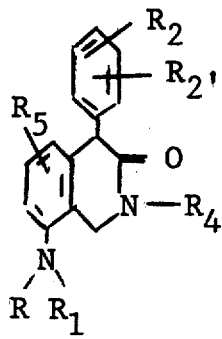

UNITED STATES PATENT AND TRADEMARK OFFICE
CERTIFICATE OF CORRECTION

PATENT NO. : 3,577,424
DATED : May 4, 1971
INVENTOR(S) : Ehrhart et al.

It is certified that error appears in the above-identified patent and that said Letters Patent are hereby corrected as shown below:

Column 3, line 7, "phenyl-2-pro" should be --phenyl-2-amino-pro--;

Column 6, line 24, "(p-nitro-" should be --(2-nitro- --;

Column 9, line 13, "4-tetrahydro-2,3-dimethyl-" should be deleted.

Signed and Sealed this

Thirty-first Day of October 1978

[SEAL]

Attest:

RUTH C. MASON
Attesting Officer

DONALD W. BANNER
Commissioner of Patents and Trademarks

UNITED STATES PATENT AND TRADEMARK OFFICE

CERTIFICATE EXTENDING PATENT TERM
UNDER 35 U.S.C. 156

Patent No.   : 3,577,424

Dated        : May 4, 1971

Inventor(s)  : Ehrhart et al.

Patent Owner : Hoechst Aktiengesellschaft

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Twenty-fifth day of April, 1986.

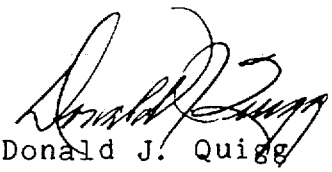

Donald J. Quigg

Assistant Secretary and Commissioner of Patents and Trademarks